United States Patent

[11] 3,584,290

| [72] | Inventor | Robert J. Spreadbury<br>Pittsburgh, Pa. |
|---|---|---|
| [21] | Appl. No. | 835,953 |
| [22] | Filed | June 24, 1969 |
| [45] | Patented | June 8, 1971 |
| [73] | Assignee | Westinghouse Electric Corporation<br>Pittsburgh, Pa. |

[54] REGULATING AND FILTERING TRANSFORMER
21 Claims, 13 Drawing Figs.

[52] U.S. Cl..................................................... 323/6,
323/60, 323/76, 323/81, 323/89, 336/155,
336/215
[51] Int. Cl...................................................... G05f 3/06,
G05f 1/12
[50] Field of Search........................................... 323/6, 44,
57, 58, 60, 61, 76, 79, 81, 88, 89; 321/25, 57, 68;
334/11, 12; 336/155, 160, 165, 214, 215

[56] References Cited
UNITED STATES PATENTS

| 2,436,925 | 3/1948 | Haug et al..................... | 323/60 |
| 2,694,163 | 11/1954 | Sola............................. | 323/61X |
| 2,772,320 | 11/1956 | Knudson et al................ | 323/60X |

*Primary Examiner*—J. D. Miller
*Assistant Examiner*—Gerald Goldberg
*Attorneys*—A. T. Stratton, F. E. Browder and Donald R. Lackey ABSTRACT: A regulating transformer which combines parallel AC fluxes in a single saturating region of a magnetic core, to efficiently couple input and output windings only during the short period of each half cycle of the AC flux when the region saturates. The output winding is connected with a capacitor to provide an oscillating tank circuit and a stable AC output voltage. The energy for sustaining the oscillation of the tank circuit is transferred from the input winding only during the time the region is saturated.

PATENTED JUN 8 1971 3,584,290
SHEET 1 OF 3
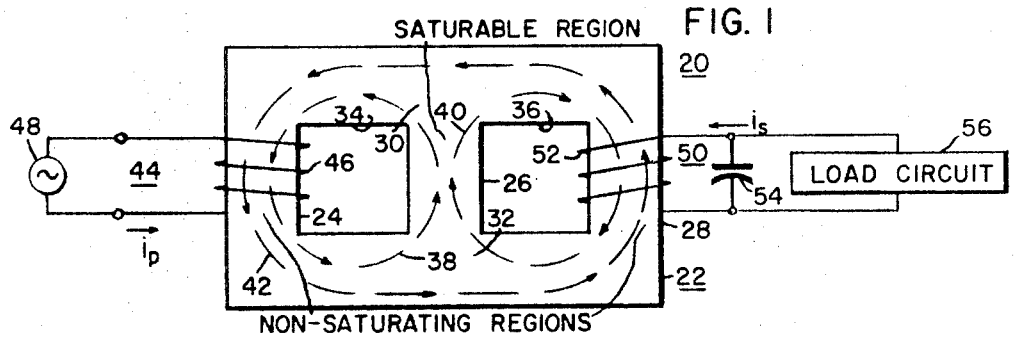
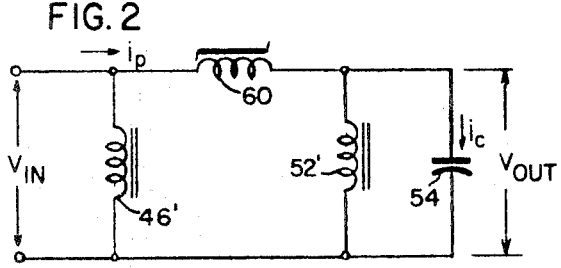
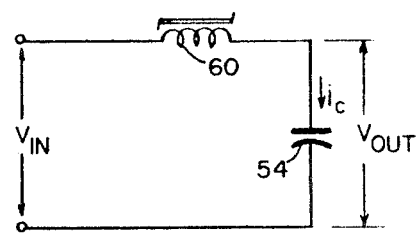
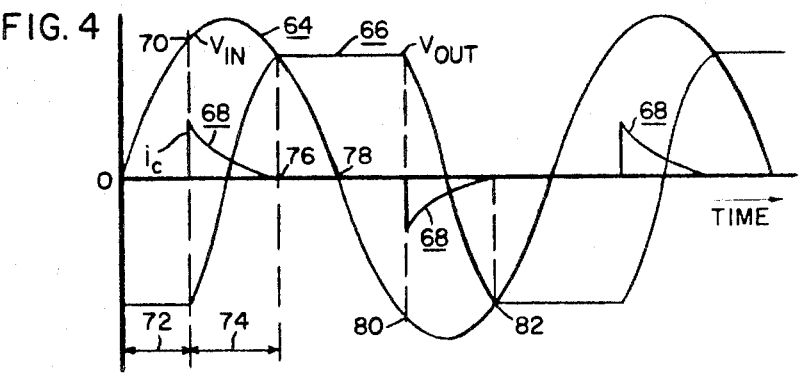
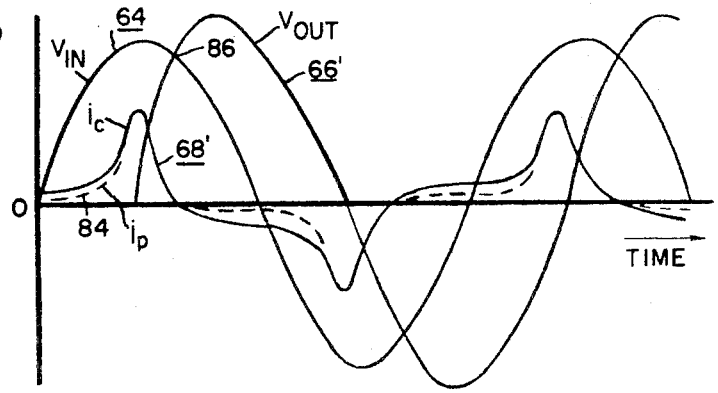
INVENTOR
Robert J. Spreadbury
BY
*Donald E. Lackey*
ATTORNEY

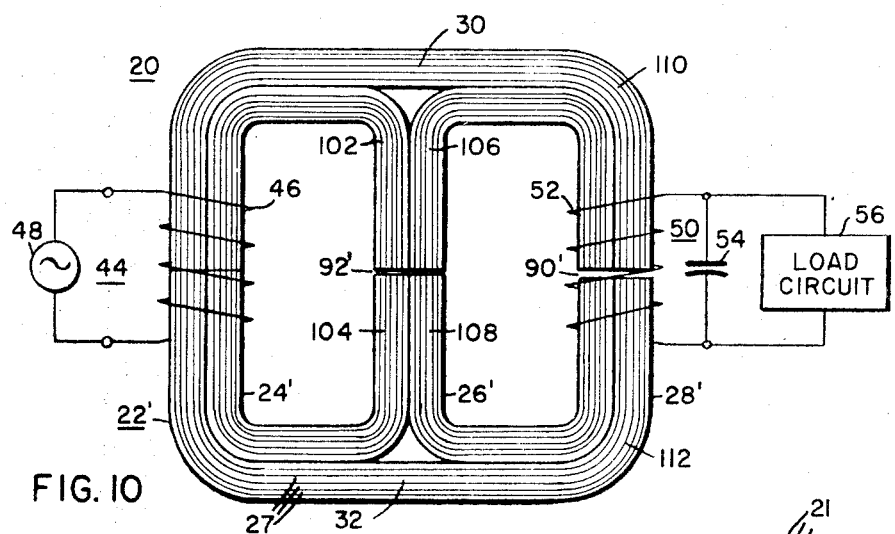
FIG. 10
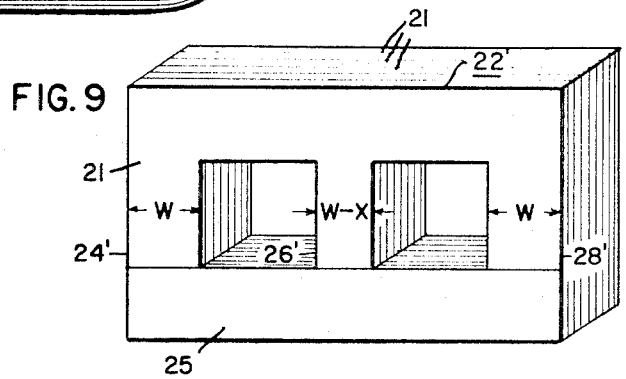
FIG. 9
FIG. 11
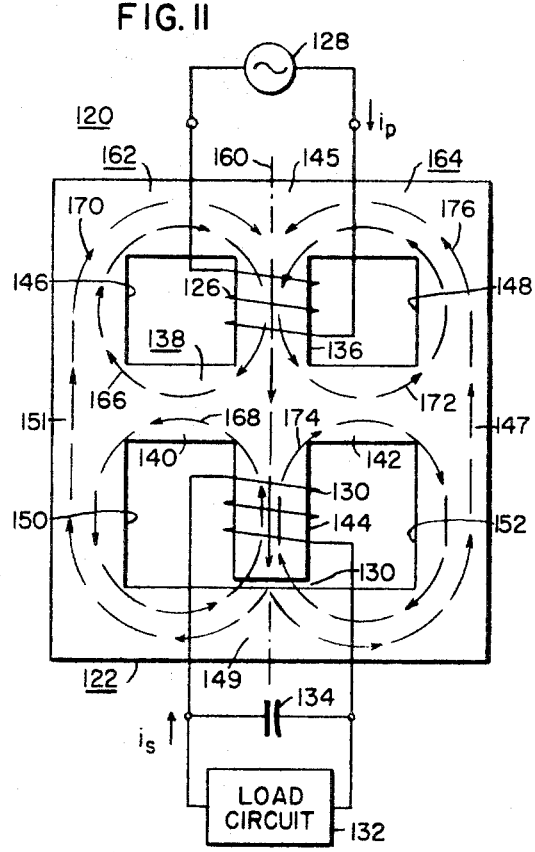
FIG. 12
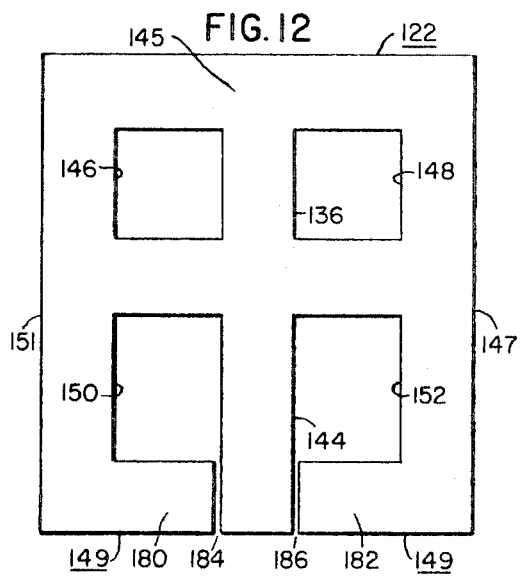

REGULATING AND FILTERING TRANSFORMER

BACKGROUND OF THE INVENTION

1. Field of the Invention

The invention relates in general to regulating transformers, and more specifically to regulating transformers of the parametric type.

2. Description of the Prior Art

Regulating transformers have been used in the prior art for many years to provide a stable output voltage, for power applications up to about 10 kva., due to their relatively low cost and their surprisingly good regulation for an open loop system. The conventional ferroresonant regulating transformer requires a relatively simple, inexpensive magnetic core structure, but has the disadvantage of continuously directly coupling the input and output windings, which thus transfers noise on the input voltage waveform into the output voltage waveform, with little attenuation. Thus, in certain applications which require a sine wave voltage without spikes and transient disturbances, such as computer power supplies, a separate filter must be connected between the regulating transformer and the load.

Another type of ferroresonant regulating transformer sometimes referred to as being of the parametric type, such as that described by H.J. McCreary in a paper entitled "The Magnetic Cross Valve and Its Application to Subfrequency Power Generation," Proceedings of National Electronics Conference, 1949, Volume 5, pages 450—566, provides a stable output voltage at the tuned frequency of a tank circuit. The input and output windings are directly coupled only for a short period of time by periodically saturating different regions of the magnetic core, to transfer energy into the tank circuit from an input winding. Thus, the output waveform is virtually unaffected by noise in the input voltage waveform. This type of transformer, however, generally has a more complicated and thus a more costly magnetic core structure than regulating transformers of the more conventional ferroresonant type, due to the prior art requirement of orthogonal placement of the input and output windings to reduce direct coupling between them. Further, these prior art magnetic cores have four magnetic paths, which results in a saturated region of a core being shunted by a nonsaturated region, reducing the efficiency of the apparatus. The relatively poor utilization of the iron also results in a relatively poor input power factor, typically 0.4 lagging.

Therefore, it would be desirable to provide a regulating transformer having a magnetic core with the structural simplicity of the conventional ferroresonant regulating transformer, and which provides the filtering action of the parametric type of regulating transformer.

SUMMARY OF THE INVENTION

Briefly, the present invention is a regulating transformer having a magnetic core which includes three regions, the adjacent ends of which are interconnected. Two of the regions are substantially nonsaturating, and the third region is saturable. One of the nonsaturating regions is linked by an input winding which produces an alternating flux dictated in phase and magnitude by an applied input voltage. The other nonsaturating region is linked by an output winding connected to a capacitor, which provides a resonant tank circuit. The flux in this region is dictated by the capacitor voltage. The two alternating fluxes share the third or saturable region without interference when this mutual or common region is below saturation. There are portions, however, of each half cycle of the fluxes during which this common region saturates, and during this time flux produced by the input wing is forced into the region linked by the output winding, transferring energy into the tank circuit by direct transformer coupling to sustain the oscillation of the tank circuit.

The regulating transformer of the invention does not require orthogonal placement of the input and output windings, requiring only a magnetic core structure having three regions, two of which are substantially nonsaturating, and a single saturating region, which simplifies and reduces the cost of the magnetic core. Further the disclosed regulating transformer eliminates the nonsaturating paths in shunt with the saturating path, substantially increasing the efficiency of the transformer, while providing a stable sine wave output voltage which is virtually unaffected by input noise. Also, the input power factor is substantially improved, up to about 0.82 lagging.

BRIEF DESCRIPTION OF THE DRAWINGS

Further advantages and uses of the invention will become more apparent when considered in view of the following detailed description and drawings, in which:

FIG. 1 is a partially schematic view of a regulating transformer constructed according to the teachings of the invention, including first and second magnetic paths, each of which have a nonsaturating region, and a common saturating region, and a third magnetic path which includes the nonsaturating regions of both the first and second magnetic paths;

FIGS. 2 and 3 are schematic diagrams of circuits which aid in understanding the operation of the regulating transformer shown in FIG. 1;

FIGS. 4 and 5 are graphs which illustrate voltage and current waveforms explanatory of the operation of the circuits shown in FIGS. 3 and 2, respectively;

FIG. 9 is a view of a magnetic core suitable for the regulating transformer of the invention, illustrating another embodiment of the invention;

FIG. 10 is a partially schematic view of a regulating transformer constructed according to the teachings of the invention, with the magnetic core of the regulating transformer being of the wound core-form-type;

FIG. 11 is a partially schematic view of a regulating transformer constructed according to the teachings of the invention, with the magnetic core being of the shell-form-type; and FIG. 12 is a view of a magnetic core of the shell-form-type which may also be used with the regulating transformer shown in FIG. 11.

DESCRIPTION OF THE PREFERRED EMBODIMENTS

Figure 6:
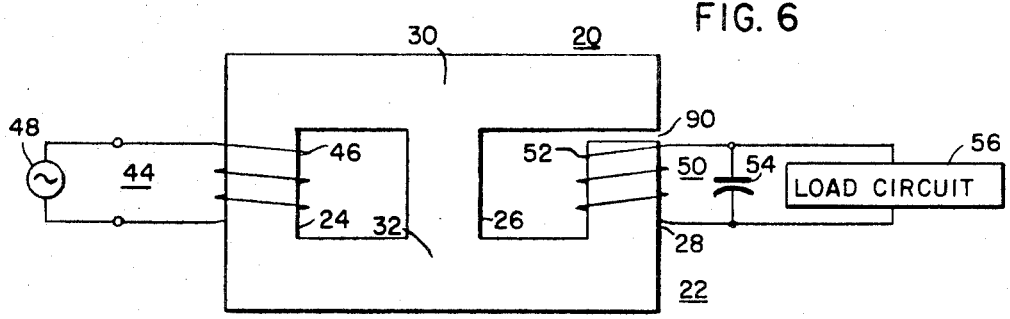
FIG. 6 is a view of the regulating transformer shown in FIG. 1, illustrating an embodiment of the invention which includes a predetermined gap in the nonsaturating region of the second magnetic path.

In general the invention is a new and improved regulating transformer which includes a magnetic core having three regions, two of which are substantially nonsaturating, while the third is saturable. The invention is hereinafter described in its simplest forms, wherein each region is a single leg portion of a magnetic core, in the core-form embodiments. However, it is to be understood that the teachings of the invention are equally applicable to magnetic core structures in which any or all of the three regions are subdivided into two or more leg portions.

Referring now to the drawings, and FIG. 1 in particular, there is shown a regulating transformer 20 of the core-form-type, constructed according to the teachings of the invention. In general, regulating transformer 20 includes a magnetic core 22, having first, second and third parallel connected regions 24, 26, and 28, provided by first, second and third spaced, parallel leg portions, respectively. The adjacent ends of the regions are joined by upper and lower yoke portions 30 and 32, respectively, defining first and second windows or openings 34 and 36, respectively. Thus, the first and third regions 24 and 28 are outer legs of the magnetic core structure 22, and the second region 26 is an inner leg. The first and third regions 24 and 28 are substantially nonsaturating input and output regions, respectively, and the second region is a common saturable region.

Magnetic core 22 has first, second and third magnetic paths 38, 40 and 42, respectively, each indicated by a succession of arrows. The first magnetic path 38 encircles the first window 34 via the first or input region 24, a portion of the lower yoke 32, the second or saturable region 26, and a portion of the upper yoke 30; the second magnetic path encircles the second window 36 via the second or saturable region 26, a portion of the lower yoke 32, the third or output region 28, and a portion of the upper yoke 30; and, the third magnetic path 42 encircles both the openings 34 and 36 via the first or input region 24, the lower yoke portion 32, the third or output region 28, and the upper yoke portion 30.

Means 44, including a primary or input winding 46, and a source 48 of AC potential, are connected to provide a first AC flux in the first magnetic path 38, and means 50, including a secondary or output winding 52 and a capacitor 54, is connected to provide a second AC flux in the second magnetic path 40. Means 50 is a tank circuit, with a load circuit 56, being connected across the parallel connected output winding 52 and capacitor 54.

It is critical for the proper operation of the regulating transformer 20 that the magnetic core 22 be constructed such that the second or common region 26 be saturable at a point less than the vector sum of the first and second AC fluxes, and that the input and output regions 24 and 28 be substantially nonsaturating within the design range of the fluxes which will link them. The input and output windings 46 and 52, respectively, in conjunction with the capacitor 54, automatically insures that the AC flux in the input and output regions adds substantially in-phase in the common saturable region 26 to saturate the common region during a portion of each half cycle of the AC flux therein. Finally, the magnetic core 22 is preferably constructed such that the reluctances of the first and third magnetic paths are such that the major portion of the flux produced by means 44 will follow the first magnetic path, while still providing sufficient flux in the third magnetic path to directly link the input and output windings and induce a voltage in the output winding 52 sufficient to charge capacitor 54 to the point necessary to make the regulating transformer 20 self-starting. However, this requirement of self-starting is merely for convenience, and not critical to the invention, as a separate starting circuit may be provided to charge capacitor 54 to the magnitude necessary to start and sustain oscillations in the tank circuit. It should be noted that unlike ferroresonant parametric regulating transformers of the prior art, the input and output windings are not disposed orthogonal to one another in an effort to reduce mutual inductance or coupling between the input and output windings, but are directly transformer coupled. The common region 26 provides a low reluctance shunt path when unsaturated which effectively decouples the input and output windings.

The common saturating region 26 of magnetic core 22 reaches saturation during each half cycle of the AC source potential 48, with the flux provided by means 44 adding to the flux provided by tank circuit 50 in region 26 during one-half cycle, as indicated by the direction of the arrows in the first and second magnetic circuits 38 and 40, and then the flux provided by means 44 and 50 both reverse their direction, still additive in the common saturable region 26, but in the opposite direction, to drive region 26 into saturation during this half cycle. In a parametrically pumped ferroresonant oscillator, the output frequency is half the pumping frequency. The parametric change in regulating transformer 20 is the change of the common region 26 from nonsaturation to saturation during each half cycle of the source potential 48. Thus, the pumping frequency is twice the frequency of the source potential 48, and the output frequency is half the pumping frequency, or the same as the frequency of the source potential. The value of capacitor 54 is selected such that the tank circuit 50 may be readily tuned to the source frequency.

When source potential 48 is connected to input winding 44, an AC flux will be produced which divides between the first and third magnetic paths 38 and 42 according to the relatively reluctances, with the geometry of the core dictating relatively weak direct transformer coupling between the input and output windings 46 and 50 via the third magnetic path 42, and a much stronger flux in the first magnetic magnetic path. The weak transformer coupling between the input and output windings, however, is unopposed by flux provided by the tank circuit 50 during startup, and thus the regulating transformer may be constructed to induce sufficient voltage into output winding 52 to charge capacitor 54 to the magnitude necessary to sustain oscillations in the tank circuit 50. The threshold voltage necessary to start and sustain oscillations in tank circuit 50 depends upon the magnitude of the load across the tank circuit. Once the tank circuit starts to oscillate, its flux in the second magnetic path 40 adds to the flux provided by means 44 in the common saturable region 26, driving region 26 to the knee of its hysteresis curve. Upon reaching saturation, region 26 is no longer a low reluctance path for the flux provided by means 44, thus forcing the flux provided by means 44 around the third magnetic path 42, strongly coupling the input and output windings 46 and 52 and inducing a voltage into the output winding 52 which charges capacitor 54 to provide the energy required to sustain the oscillations of the tank circuit. Region 26 only stays in saturation for a few degrees, typically less than 15, of the half cycle of the source potential, with the strong transformer coupling occurring only during this very short interval of time. During the remaining portions of each half cycle of the source potential, the input and output windings are effectively isolated. Thus, it will be readily understood that the output voltage waveform is not substantially affected by noise in the input voltage waveform. For a cyclic disturbance, i.e., waveform distortion and/or periodic spikes, the regulating transformer 20 will integrate the overall energy level and provide a filtered stable output voltage. Only a strong random pulse or transient disturbance which occurs precisely at the moment of saturation of the common leg would disturb the output voltage waveform, as it is only during this short period that the input and output windings are coupled. Even then the noise is attenuated, as the short direct inductive coupling of the input and output windings occurs at the voltage zero of the tank circuit. Thus, the filtering action of regulating transformer 20 is excellent, being measured as high as 63 db. on light loads and 45 db. at full load. Further, disturbances in the secondary or output circuit are not transmitted to the input winding.

The mechanism of voltage stabilization and sine wave output of regulating transformer 20 may be better understood by studying the equivalent circuit diagram of regulating transformer 20, which is shown in FIG. 2. The effective leakage inductance of the regulating transformer 20 is represented by a saturable inductor 60, which is connected in series with capacitor 54 across the source potential. The magnetizing inductances represented by the input and output windings 46 and 52, respectively, are indicated by inductors 46' and 52', respectively. The series inductor 60 is directly equivalent to the shunting effect of the saturable region 26. The equivalent circuit of regulating transformer 20, shown in FIG. 2, is fundamentally different than the equivalent circuit for the conventional ferroresonant transformer. In the conventional ferroresonant transformer, the saturable inductor is in the location of inductor 52 while the series inductor is linear, which thus accounts for their entirely different modes of operation.

Before describing the operation of the equivalent circuit diagram shown in FIG. 2, it is advantageous to further simplify this circuit to provide the circuit shown in FIG. 3, which includes only the saturable inductor 60 and capacitor 54, connected serially with the source potential. FIG. 4 is a graph illustrating curves of various current and voltage waveforms which are explanatory of the operation of the circuit shown in FIG. 3, with curve 64 being the input or source voltage $V_{IN}$, curve 66 being the voltage across capacitor 54, or the output voltage $V_{OUT}$, and curve 68 being the capacitor current $i_c$.

Specifically, when the input voltage $V_{IN}$ begins to increase from zero, there will be negligible current flow, as the saturable inductor 60 stands off the source voltage for a predetermined time, which is determined by the volt-second characteristic of the inductor. When inductor 60 saturates, indicated by point 70 on curve 64, and also by angle 72, current $i_c$ will flow and charge capacitor 54. The charging current and voltage reached by capacitor 54 at the end of each half cycle of the source voltage 64 depends upon the point of saturation. Capacitor 54 charges with a time constant dependent upon the resistance of the saturable inductor 60, and the capacitor value. At time 76 the charging current $i_c$ reaches zero and the output voltage $V_{OUT}$ is equal to the input voltage $V_{IN}$ [assuming zero inductance for the saturated inductor 60]. A moment later, the source voltage $V_{IN}$ drops below the capacitor voltage, and negative volt-seconds are now applied to inductor 60, causing it to revert to its blocking condition. At time 78, the source potential curve 64 reverses polarity and now adds to the capacitor voltage as negative volt-seconds being applied to inductor 60. At point 80 on the input voltage waveform 64, inductor 60 reaches its negative volt-second saturation point, and capacitor 54 discharges and recharges to the source voltage at point 82 on the input voltage waveform 64. Thus, capacitor 54 is only effectively connected to the source potential for the charging period 74, and is effectively disconnected at all other times. Until the source potential supplies the volt-seconds necessary to saturate the inductor 60, the inductor effectively disconnects the capacitor from the source potential.

Once the system starts oscillating, the capacitor voltage adds to the source potential to take the inductor 60 into saturation. Thus, the input voltage may be reduced below the magnitude necessary to start oscillation. The minimum source voltage magnitude would be that value where the sum of the volt-seconds of the capacitor and of the source potential are insufficient to saturate inductor 60. Below this minimum point, the oscillations would not be sustained, and the output of regulating transformer 20 would drop to a low magnitude, determined by the magnitude of the source potential and the weak inductive coupling between the input and output windings.

Now, consider the more representative equivalent circuit of regulating transformer 20, which is shown in FIG. 2, in which a shunting inductance appears across capacitor 54, as well as the impedance of any connected load. Thus, the voltage across capacitor 54 will not be a constant during the time the series saturable inductor 60 is nonsaturated, and capacitor current will be flowing throughout the operation of the regulating transformer. The action of the equivalent circuit shown in FIG. 2 is explained by the graph shown in FIG. 5, with curve 64 indicating the source potential $V_{IN}$, curve 66' indicating the output voltage $V_{OUT}$ across the capacitor, curve 68' representing the capacitor current $i_c$, and the dotted curve 84 indicating the current $i_p$ through the saturable inductor 60.

The series saturable inductor 60 in actual operation will not saturate instantaneously or completely, resulting in a resonant overshoot of the capacitor voltage beyond its intersection 86 with the input voltage waveform 64. The linear inductance 52' is relatively large, resulting in the discharge current $i_c$ being substantially linear, which causes a linear decrease in the output voltage $V_{OUT}$ across the capacitor. If the shunting inductance 52' is slightly voltage responsive, the increasing magnetizing current will drag the capacitor voltage down even faster, which flattens out the slight bump in the waveform of the output voltage, which occurs as the output voltage approaches zero from its positive and negative peaks. As will be hereinafter explained, the output voltage waveform may be improved by providing a gap in the output region 28 of the magnetic core 22 shown in FIG. 1, which prevents too great a variation of the shunt inductance 52' in the voltage sensitive region, resulting in a well rounded sine wave.

The volt-second integral of the series saturable inductor 60 is constant for any specific design of regulating transformer. This characteristic determines the voltage stabilization characteristics of the transformer. Thus, if the input voltage $V_{IN}$ increases, the saturating angle 72 shown in FIG. 4 will decrease, which advances the output voltage waveform relative to the input voltage waveform. The capacitor peak voltage will tend to increase, but the increased voltage across the capacitor 54 will take the slightly voltage sensitive inductor 52' into the bend of its saturation curve slightly earlier, resulting in a more rapid discharge of the capacitor. Thus, increasing the input voltage results in a slight sharpening of the output voltage waveform, while maintaining the voltage output substantially constant. If the input voltage $V_{IN}$ decreases, the saturating angle 72 increases and the output voltage drops further back relative to the input voltage $V_{IN}$. The reduction in output voltage is accompanied by an increase in primary current, caused by the fact that the decreased peak voltage achieved by the capacitor at the end of the charging current pulse means less discharge current via the shunt inductor 52', and hence a higher resultant capacitor voltage at the end of the flat peak in the output voltage waveform 66 shown in FIG. 4. This extra capacitive energy must be discharged before recharging to the opposite polarity, resulting in increased current taken from the primary winding.

If the input voltage is increased beyond the design limits, the "pumping" of the capacitor once each half cycle will continue and normal regulation will be obtained, but the magnetic path for the primary winding will become saturated and the primary will take, in addition to the pumping current pulse, a normal lagging magnetizing component of current. The amplitude of the pumping current pulse decreases with increased input voltage, while the saturation current pulse increases.

If the input voltage is decreased, beyond design limits, a point will be reached where the charge on the capacitor plus the input voltage is insufficient to saturate the series inductor 60, and the regulating transformer will abruptly switch to its very low output voltage mode.

Increasing the load on the regulating transformer 20 increases the discharge rate of the capacitor 54, resulting in a slight sharpening of the output waveform curve. The resulting reduced capacitor voltage will increase the time delay angle 72 for saturation, resulting in the output voltage lagging the input voltage by a greater angle. The output voltage $V_{OUT}$ lags the input voltage by an angle of about 70° at no load, which increases to about 90° at full load. This approximately 90° phase shift between the input and output voltage waveforms confirms that the operation is parametric. The conventional ferroresonant transformer starts with the output voltage in phase with the input voltage at no load, with the output voltage dropping back to about 30° lagging at full load.

The load impedance shunts the current away from the slightly voltage sensitive shunt inductor 52', and the fairly rapid discharge the capacitor experienced without load, when the shunt inductor 52' went into the knee of its saturation curve, is now replaced by a steady discharge path offered by the load impedance. This has the effect of removing the more rounded no load appearance of the output voltage waveform, producing a more nearly sinusoidal waveform. If the regulating transformer 20 is overloaded beyond a predetermined point, or the output is short circuited, the tank circuit will cease to oscillate, resulting in a jump transition to its low output mode, of about 10 percent of the rated output. The short circuit current is typically 25 percent of the rated current.

As hereinbefore stated, the output voltage may be optimized from the standpoint of harmonic content, by placing a gap in the output region 28, thus making the second magnetic circuit 40 more linear, resulting the shunting inductor 52' shown in FIG. 2 being more linear and less voltage sensitive. This embodiment of the invention is shown in FIG. 6, which illustrates the regulating transformer 20 shown in FIG. 1, except modified to include a nonmagnetic gap 90 in the output region 28. Nonmagnetic gap 90 may be disposed at any location in region 28. The dimensions of the gap 90 are a compromise between harmonic content and power output capability of the regulating transformer, with a dimension of about 20 mils per square inch of cross-sectional area of the third leg portion providing a good waveform without undue sacrifice in output power capability. The gapping of the output region 28 of regulating transformer 20 to obtain output voltage waveform improvement is another basic distinction between regulating transformer 20 and a conventional ferroresonant transformer. A gap in the output leg of the conventional ferroresonant transformer reduces the stabilization ability of the device, and if great enough, would make the device inoperative. On the other hand, the gap 90 in the output region 28 of regulating transformer 20 actually increases the stability of its operation. Gap 90 also enhances the decoupling of the input and output windings. Thus, the magnitude of gap 90 may be used to determine the voltage magnitude or threshold voltage required to start the operation of the transformer. In practice, the transformer is made self-starting at the lowest design input voltage by selecting a gap dimension near the preferred 20 mils per square inch of cross-sectional area of the output leg, and properly proportioning the cross-sectional areas of the output and saturating legs. In prior art four path parametric regulating devices with orthogonal placement of the input and output windings, automatic self-start by raising the input voltage into the design range is obtainable only by degrading the design, resulting in higher losses for any predetermined output rating, as well as poorer output voltage regulation.

With no gap in the second magnetic path 40, it is possible, under certain input voltage and load conditions, to obtain a lower frequency amplitude modulation of the desired output voltage. This effect is completely eliminated by placing a nonmagnetic gap in the second magnetic path 40, such as gap 90 in the output region 28, as shown in FIG. 6.

The dimension of gap 90 is fixed more by output waveform requirements, however, than it is by the low frequency amplitude modulation requirements. It has also been observed that the nonmagnetic gap 90 also improves the stability of the output oscillating circuit.

Figure 7:
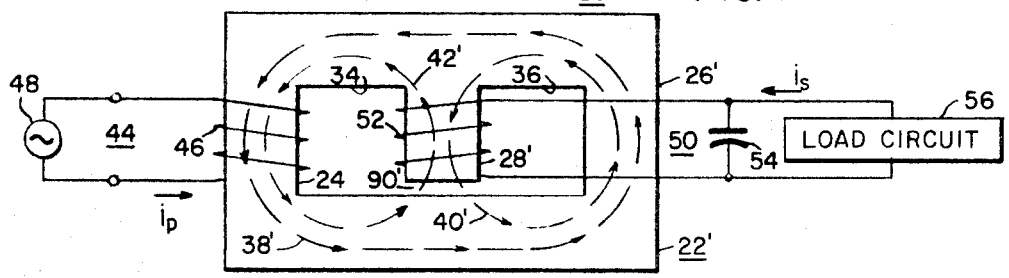
FIGS. 7 and 7A are views of regulating transformers which illustrate alternative embodiments of the construction shown in FIG. 6.
Figure 7A:
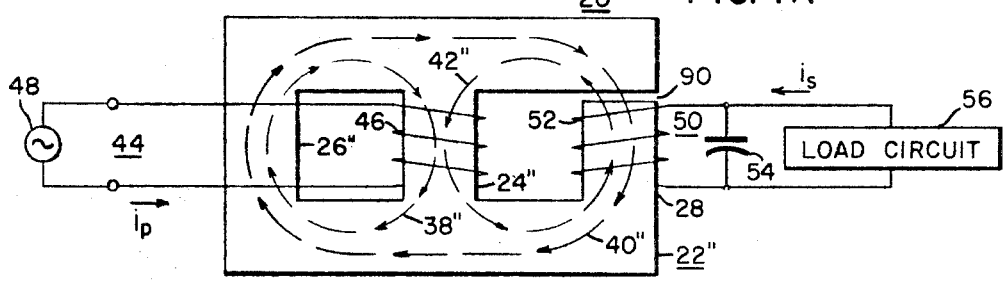

The regulating transformer of the invention requires substantially nonsaturating input and output regions, and a saturating common region. Therefore, while the arrangement shown in FIG. 6 is the preferred embodiment, the locations of the input, output, and common regions may be changed and still obtain parametric operation. FIGS. 7 and 7A illustrate different embodiments of regulating transformer 20 shown in FIG. 6, with like reference numerals indicating like components, and like reference numerals with prime marks indicating components of like function but modified structure.

More specifically, FIG. 7 is a partially schematic view of a regulating transformer 20' of the core-form-type, having a magnetic core 22' which differs from the magnetic core 22 shown in FIG. 6 in that the relative positions of the common and output regions of the core have been exchanged. The common or saturating region 26 is an outer leg portion of core 22', referenced 26' in FIG. 7, while the output region 28 is the inner leg portion, referenced 28' in FIG. 7.

The input winding 46 and source potential 48 produce a first AC flux in the input region 24, with the first AC flux primarily following magnetic path 38', which includes the common saturating region 26'. The first AC flux is directed in this path by properly selecting the dimension of a gap 90' in the output region 28', and the relative cross-sectional areas of the common and output regions 26' and 28', respectively. The AC flux produced in the output region 28' by the oscillating tank circuit 50 follows a second magnetic path 40' about window 36, which adds to the first AC flux in the common region 26'. When the common region 26' saturates each half cycle of the flux, typically for about 15° of the flux near the peak magnitudes thereof, any further increase in the first AC flux is forced into the magnetic path 42', which includes output region 28'. Thus, for these very short periods during each half cycle of the AC flux, the output circuit is "pumped," i.e., energy is transferred into the tank circuit 50 by direct transformer coupling between the input and output windings.

FIG. 7A is a partially schematic view of a regulating transformer 20", having a magnetic core 22" which differs from the magnetic core 22 shown in FIG. 6 in that the locations of input and common regions have been exchanged. The input region 24" is now the inner leg, the common saturating region 26" is an outer leg, and the output region 28 is an outer leg. The source potential 48 and input winding 46 produces a first AC flux in input region 24", which is directed primarily through a first magnetic path which includes the common region 26", by coordinating the dimension of gap 90 in the output region 28 and the relative cross-sectional areas of the common and output regions, 26" and 28, respectively.

The tank circuit produces a second AC flux in output region 28 which follows a second magnetic path 40", which includes the common region 26". When the common region 26" saturates during each half cycle of the AC fluxes, any further increase in the first AC flux is directed in a path 42" which links the output winding 52, transferring energy into the tank circuit 50 by transformer action, to sustain the oscillation of the tank circuit.

It should be noted that the common region, which is driven into saturation each half cycle of the AC fluxes, is free of electrical windings. Thus, heat produced in this region, the hardest worked portion of the core, is not impeded by windings in escaping from the apparatus, resulting in a lower maximum operating temperature than apparatus which encircles saturating portions of the core with electrical windings.

Since subfrequency instabilities may be eliminated by a gap in the second magnetic path 40, it would also be possible to place a gap in the common or saturating region 26 of regulating transformer 20, to achieve the same objective. The dimensions of any gap in the saturating region 26 however, are extremely critical in that the gap must not be too large. It is essential to the parametric operation of regulating transformer 20 that the common region 26 saturate during each half cycle of the source potential. Thus, a linearizing gap in the common region cannot be tolerated. This is unlike the conventional ferroresonant regulating transformer, which includes a relatively large linearizing gap in the leg portion of the core not encircled by an input or output winding. Thus, if a gap is disposed in the saturable region 26 of regulating transformer 20, it should be very small, not exceeding about 5 mils, and preferably in the order of 1 to 2 mils, and preferably in the order of 1 to 2 mils.

Figure 8:
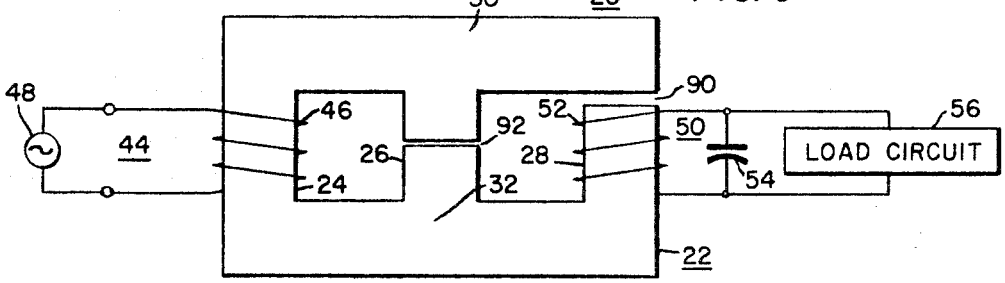
FIG. 8 is a view of the regulating transformer shown in FIG. 1, illustrating an embodiment of the invention which includes a predetermined gap in the nonsaturating region of the second magnetic path, and a predetermined gap in the saturating common region of the first and second magnetic paths.

It has been found that even when the subfrequency instabilities have been eliminated by disposing a gap 90 in the output region 28 of the magnetic core 22, that it may still be desirable to provide a very small gap, i.e., 1 to 2 mils, in the common saturable region 26 of the core. This embodiment of the invention is illustrated in FIG. 8. FIG. 8 illustrates the regulating transformer 20 of FIG. 1, modified to include a very small gap 92 in the saturating region 26, and a relatively larger gap 90 in the output region 28. This arrangement of gaps 92 and 90 in the saturating and output regions 26 and 28, respectively, allows the upper voltage range of the regulating transformer to be extended, by enabling the self-start to occur at a somewhat lower voltage. The small gap 92 in the saturating region 26 has the effect of increasing the direct coupling between the input and output windings 46 and 52, respectively. The small gap 92 in the saturating region 26 also controls the maximum short circuit current upon short circuit conditions. With little or no airgap in the saturating region 26, the short circuit current is set by the relative reluctances of the first and third magnetic paths 38 and 42, respectively, and typically is 10—20 percent of full load current. Increasing the gap 92 increases the short circuit current, but the gap 92 cannot be increased to the point where parametric operation of the regulating transformer 20 ceases. Therefore, the gaps 90 and 92 in the output and saturating regions 28 and 26, respectively, are selected to give sufficient direct coupling between the input and output windings to start the parametric operation of the regulating transformer at a predetermined threshold voltage, while at the same time taking into account the improvement in output voltage waveform and the compromise required between optimizing the waveform to reduce harmonic content, and the reduction in the volt-ampere capacity which occurs when the gap in the output region 28 becomes excessively large. Increasing the gap in the output region 28 decreases the inductance of the tank circuit 50, which reduces the voltage developed across the tank circuit and thus reduces the volt-ampere output capacity of the transformer.

The ability to improve the output voltage waveform of regulating transformer 20 by adjusting the gap dimension in the third or output region 28 is another important advantage of regulating transformer 20. In a conventional ferroresonant type regulating transformer, special harmonic windings and/or harmonic traps across the output windings are usually utilized to improve the waveform, which increases the size, cost and weight of the apparatus.

Up to this point, the regulating transformer 20 has been shown functionally as utilizing a magnetic core 22 having leg portions of substantially equal cross-sectional areas, with the reluctances of the different magnetic paths being primarily adjusted by nonmagnetic gaps. Since the reluctance of a magnetic path is responsive to the length of the path, the cross-sectional area of the path, and the permeability of the material of which the path is constructed, one or more of these factors may be changed to adjust the relative reluctances of the different magnetic paths. For example, magnetic core 22 shown in FIG. 1 may be modified to provide a magnetic core 22' shown in FIG. 9, wherein the input and output regions 24' and 28' have a predetermined width dimension W, while the saturating region 26' has a predetermined dimension which is less than the dimension W, indicated in FIG. 9 with the dimension W-X. This construction would increase the direct coupling between the input and output windings to reduce the threshold voltage required to initiate parametric operation, without degrading the saturable characteristics of the common region 26'.

While the magnetic cores illustrated in FIGS. 1 and 6—9 have been shown with square outer corners, characteristic of magnetic cores of the stacked type, it is to be understood that the magnetic core 22 may be stacked or wound, as desired. Since the fluxes in the core are in general parallel to the longitudinal dimensions of the leg and yoke portions, wound and stacked cores would be equally efficient. Thus, magnetic core 22' shown in FIG. 9 may be constructed of a plurality of layers 21 of magnetic, metallic E-I laminations, 23 and 25 respectively which are reversed from layer-to-layer, with the magnetic material preferably being grain oriented silicon steel. Of course, other configurations for the laminations may be utilized to provide the stacked leg and yoke portions, as desired.

When nonmagnetic gaps are utilized in the magnetic circuits, such as the gap 90 in the third or output region, it has been found that with a stacked type core it is more difficult to clamp the laminations to prevent noise due to magneto-striction. Thus, especially when nonmagnetic gaps are utilized in the magnetic paths a magnetic core of the wound type, having a plurality of loops of nested laminations, has been found to be preferable, as it may be easily assembled about the windings and banded to hold the two halves of the core in assembled relation. A suitable nonmagnetic material may be disposed in the gap, or gaps, if used, to maintain the desired spacing. Sheet-type plastic materials have been found to be suitable for this purpose.

An embodiment of the invention utilizing a wound magnetic core is illustrated in FIG. 10, with like reference numerals in FIGS. 8 and 10 indicating like components. Prime marks have been added in FIG. 10 to denote the core components which are similar in function but modified in structure.

Specifically, magnetic core 22' shown in FIG. 10 may be of the type conventionally used for three-phase core-form applications, having first and second core loops disposed in side-by-side relation, formed by C-cores 102 and 104, and 106 and 108, respectively, which are both encircled by a core loop formed of C-cores 110 and 112. The various core loops are assembled and their laminations 27 bonded together, to provide a coherent solid structure, and the consolidated core is then cut into two matching sections without delamination. If gaps 92' and 90' are provided in the saturating and output regions 26' and 28', respectively, they may be easily provided by grinding, after the core is cut. The two halves of the core may then be assembled about windings 46 and 52, while inserting nonmagnetic filler pieces in the gaps, and the core may then be banded to hold the core halves in assembled relation about the windings.

While the embodiments of the invention hereinbefore described have been illustrated with the preferred core-form construction of the regulating transformer, the teachings of the invention may also be applied to shell-form construction. FIG. 11 is a view of a regulating transformer 120 of shell-form construction, having a magnetic core 122, an input winding 126 connected to a source 128 of AC potential, and an output winding 130 connected to a load circuit 132 and a capacitor 134. Capacitor 134 and output winding 130 provide the required tank circuit.

The magnetic core 122 has an input region defined by leg portion 136, upon which the input winding 126 is disposed, a saturating region defined by leg portion 138, which includes first and second members 140 and 142, and an output region defined by leg portion 144. The leg portions are formed by intersecting or crossed members, with legs 136 and 144 forming one of the crossed members, and leg portion 138 forming the other of the crossed members. Legs 136 and 144 extend perpendicularly outward from opposite sides of the common or saturating leg portion 138. The adjacent outer ends of the leg portions are interconnected by yoke portions 145, 147, 149 and 151, to define four window openings in the core structure, referenced 146, 148, 150 and 152. Input windings 126 encircles leg portion 136 through adjacent windows 146 and 148, and the output winding 130 encircles leg portion 144 through the adjacent remaining windows 150 and 152. It will be noted that while the magnetic core structure 122 appears to be similar to the four path parametric devices of the prior art, that the windings are not disposed orthogonal to one another through diagonal windows, as taught by the prior art. Further, the regulating transformer 120 does not operate in the same manner, as in the four path structures of the prior art different leg portions are saturated on alternate half cycles. Regulating transformer 120 is very similar to two of the regulating transformers shown in FIG. 1 being placed side-by-side, except with one input and one output winding generating the fluxes for both cores. Portions 140 and 142 of the saturating leg portion 138 each saturate on each half cycle of the source potential. This may be readily observed by visualizing the magnetic core as being divided along centerline 160 into first and second portions 162 and 164. Portion 162 has a first magnetic path 166 which encircles window 146, a second magnetic path 168 which encircles window 150, and a third magnetic path 170 which encircles both windows 146 and 150. Leg member 140 of leg portion 138 is the saturating common region of the first and second magnetic paths, and this half of the core operates as hereinbefore described relative to regulating transformer 20 shown in FIG. 1. The second half 164 of magnetic core 122 is similarly constructed, having a first magnetic path 172 which encircles window 148, a second magnetic path 174 which encircles window 152, and a third magnetic path 176 which encircles both windows. This half of the magnetic core also operates as hereinbefore described relative to the regulating transformer 20 shown in FIG. 1, with the leg member 142 of the saturating leg portion 138 being the common saturating portion of the first and second magnetic circuits.

Nonmagnetic gaps may be utilized in the magnetic core structure 122, similar to those hereinbefore described relative to the core-form embodiments of the invention. For example, a gap 130 may be disposed in the third or output leg portion 144, such as between the end of the leg portion 144 and the side of the yoke portion 149, as shown in FIG. 11; or, as illustrated in FIG. 12, magnetic core 122 may be modified to provide a magnetic core 122', wherein the yoke 149 is divided into two spaced portions 180 and 182 and the leg portions 144 extends into the opening between the divided yoke portions. The leg portion 144 is spaced from the ends of the divided yoke portions to provide nonmagnetic gaps 184 and 186.

Self-starting regulating transformers rated 250 va. and 1 kva., both of the core-form-type, were constructed according to the teachings of the invention and tested to determine their performance. Regulation at full load with a ± 15 percent change in input voltage from the nominal value was better than ± 0.5 percent, while regulation from no load to full load at nominal input voltage was − 0.5 percent for the 250 va. unit and − 1.75 percent for the 1 kva. unit Efficiency at full load at rated input voltage was 81 percent for both units, and the full load input power factor at nominal input voltage was 0.82. The power factor of the load was varied from 0 to 1 lead and lag, and found to have little affect on the operation of the transformer.

While the invention has been described relative to a regulating transformer for regulating an output voltage having the same frequency as the input voltage, it will be understood that the regulating transformer may be used as a subfundamental frequency power generator, by initially tuning the tank circuit to the desired frequency and utilizing a capacitor which is selected to sustain the tuned frequency. Further, the disclosed invention may be used in many other applications, such as in voltage and/or frequency sensitive trip monitors, and frequency modulators.

In summary, there has been disclosed a new and improved regulating transformer which features a magnetic core having the simplicity of the conventional ferroresonant type of regulating transformer, and it does not require bucking winding or harmonic filters and traps to provide a stable output voltage having a harmonic content in the order of 7—8 percent. Further, unlike conventional ferroresonant regulating transformers, the operation of the disclosed regulating transformer is parametric, with the extremely good bilateral filtering characteristics of the parametric ferroresonant regulating transformer. The disclosed regulating transformer automatically switches to a low output voltage mode on overload and on under voltage, and the unit is self-starting without overdriving the magnetic core upon startup. When a short circuit occurs, the regulating transformer of this invention reverts to its low voltage output mode, allowing a short circuit current to flow which is less than the rated full load current, and upon the removal of the short circuit the unit immediately restores the rated regulated output voltage. Since the input and output windings of the transformer are directly coupled for only a few degrees of each half cycle of the source potential, it is not necessary for the input voltage to be a sine wave, as the sine wave output is determined by the tank circuit and the characteristics of its associated magnetic circuit, and not due to the input waveform. Further, the disclosed regulating transformer is an improvement over the four path parametric ferroresonant transformers of the prior art, which teach orthogonal placement of the input and output windings. For example, the disclosed regulating transformer incorporates a self-starting characteristic without degrading performance parameters, the disclosed regulating transformer is more efficient, it has a better input power factor, and requires less capacitive kvar. per kva. of output, due to the fact that the disclosed transformer incorporates a three path structure, eliminating the shunt path of the prior art four path devices which circulate flux in shunt with the saturated inductance.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim:

1. A regulating transformer, comprising: a magnetic core having first, second and third regions,
means interconnecting said first, second and third regions to provide closed magnetic paths,
means including an input winding, providing a first AC flux in said first region,
means including an output winding and a capacitor connected in parallel to provide a resonant tank circuit, providing a second AC flux in said third region,
and means including output terminals, connected to provide an output voltage responsive to the voltage across said output winding,
said second region being free of windings,
said magnetic core being constructed and dimensioned to cause said first and second AC fluxes to add in said second region, and to saturate said second region during a portion of each half cycle of said second AC flux,
said first and third regions being substantially nonsaturating,
said second region shunting the major portion of said first AC flux away from said output winding when said second region is unsaturated,
the saturation of said second region forcing the major portion of a further increase in said first AC flux to link said output winding, transferring energy into said tank circuit to sustain the oscillation thereof.

2. The regulating transformer of claim 1 wherein the first, second and third regions of the magnetic core are spaced, parallel leg portions thereof.

3. The regulating transformer of claim 2 wherein the second region is the inner leg portion.

4. The regulating transformer of claim 1 wherein the third region includes a linearizing nonmagnetic gap therein.

5. The regulating transformer of claim 1 wherein the magnetic core is constructed of stacked metallic laminations.

6. The regulating transformer of claim 1 wherein the magnetic core is constructed of loops of nested metallic laminations.

7. The regulating transformer of claim 1 wherein the first and third regions extend perpendicularly outward from opposite sides of said second region.

8. The regulating transformer of claim 1 wherein the magnetic core is of the shell-form-type, including a first member which forms the second region, and second and third members which extend perpendicularly outward from opposite sides of said first member to form the first and third regions, respectively.

9. A regulating transformer, comprising:
a magnetic core having spaced parallel leg portions providing first, second and third regions, with the second region being an outer leg portion,
means interconnecting said first, second and third regions to provide closed magnetic paths,
means including an input winding, providing a first AC flux in said first region,
and means including an output winding and a capacitor connected in parallel to provide a resonant tank circuit, providing a second AC flux in said third region,
said second region being free of windings,
said first and second AC fluxes adding in said second region, saturating said second region during a portion of each half cycle of said second AC flux,
said first and third regions being substantially nonsaturating,
said second region shunting the major portion of said first AC flux away from said output winding when said second region is unsaturated,
the saturation of said second region forcing the major portion of a further increase in said first AC flux to link said output winding, transferring energy into said tank circuit to sustain the oscillation thereof.

10. The regulating transformer, comprising:
a magnetic core having first, second and third regions,
said second region including a nonmagnetic gap therein, the dimensions of which are selected to retain the saturable characteristic thereof, said third region including
a linearizing nonmagnetic gap therein, means interconnecting said first, second, and third regions to provide closed magnetic paths, means including an input winding, providing a first AC flux in said first region, and means including an output winding and a capacitor connected to provide a resonant tank circuit, providing a second AC flux in said third region, said second region being free of windings, said first and second AC fluxes adding in said second region, saturating said second region during a portion of each half cycle of said second AC flux, said first and third regions being substantially nonsaturating, said second region shunting the major portion of said first AC flux away from said output winding when said second region is unsaturated, the saturation of said second region forcing the major portion of a further increase in said first AC flux to link said output winding, transferring energy into said tank circuit to sustain the oscillation thereof.

11. A regulating transformer comprising: a magnetic core including input, output, and common leg portions, an input winding disposed on said input leg portion, adapted for connection to a source of AC potential, an output winding disposed on said output leg portion, said common leg portion being free of windings, a capacitor connected in parallel with said output winding to provide a tank circuit, and means including output terminals connected to provide an output voltage responsive to the voltage across said output winding, said common leg portion being constructed to saturate during a portion of each half cycle of the AC source potential, when said input winding is connected thereto, due to flux produced in said common leg portion by current flowing in said input winding and in said tank circuit, said output leg portion being constructed to be substantially nonsaturating.

12. The regulating transformer of claim 11 wherein the magnetic core is of the core-form-type, with the input and output leg portions being outer legs and the common leg portion being an inner leg.

13. The regulating transformer of claim 11 wherein the output leg portion has a gap therein having a dimension selected to provide the nonsaturating characteristic of the output leg portion.

14. The regulating transformer of claim 11 wherein the cross-sectional area of the common leg portion is less than the cross-sectional area of the output leg portion.

15. A regulating transformer comprising:

a magnetic core including input, output, and common leg portions, said common leg portion including a gap therein having a dimension selected to retain the saturating characteristics of the common leg portion, said output leg portion including a gap therein having a dimension selected to provide the nonsaturating characteristic of said output leg portion, an input winding disposed on said input leg portion, adapted for connection to a source of AC potential, an output winding disposed on said output leg portion, adapted for connection to a load circuit, said common leg portion being free of windings, and a capacitor connected across said output winding to provide a tank circuit, said common leg portion being constructed to saturate during a portion of each half cycle of the AC source potential, when said input winding is connected thereto, due to flux produced in said common leg portion by current flowing in said input winding and in said tank circuit, said output leg portion being constructed to be substantially nonsaturating.

16. A regulating transformer comprising:

a magnetic core including input, output, and common leg portions, said common and output leg portions each having a gap therein, with the gap in the common leg portion having a substantially smaller dimension than the gap in the output leg portion, an input winding disposed on said input leg portion, adapted for connection to a source of AC potential, an output winding disposed on said output leg portion, adapted for connection to a load circuit, said common leg portion being free of windings, and a capacitor connected across said output winding to provide a tank circuit, said common leg portion being constructed to saturate during a portion of each half cycle of the AC source potential, when said input winding is connected thereto, due to flux produced in said common leg portion by current flowing in said input winding and in said tank circuit, said output leg portion being constructed to be substantially nonsaturating.

17. A regulating transformer comprising: a magnetic core including input, output, and common leg portions, said magnetic core being of the shell-form-type, including first and second intersecting crossed members, the adjacent ends of which are interconnected to define four window openings, with each of said crossed members having first and second portions which extend outwardly from opposite sides of the other crossed member, and wherein the input and output leg portions are provided by the first and second portions of said first crossed member, and said common leg portion is provided by the first and second portions of said second crossed member, an input winding disposed on said input leg portion, adapted for connection to a source of AC potential, an output winding disposed on said output leg portion adapted for connection to a load circuit, said common leg portion being free of windings, and a capacitor connected across said output winding to provide a tank circuit, said common leg portion being constructed to saturate during a portion of each half cycle of the AC source potential, when said input winding is connected thereto, due to flux produced in said common leg portion by current flowing in said input winding and in said tank circuit, said output leg portion being constructed to be substantially nonsaturating.

18. A regulating transformer comprising:

a magnetic core including input, output, and common leg portions, said magnetic core being of the shell-form-type, including first and second intersecting crossed members, the adjacent ends of which are interconnected to define four window openings and a plurality of magnetic paths, with each of said crossed members having first and second portions which extend outwardly from opposite sides of the other crossed member, said input and output leg portions being provided by the first and second portions of said first crossed member, and said common leg portion being provided by the first and second portions of said second crossed member, the magnetic paths which include the second portion of the first crossed member having a nonmagnetic gap therein, an input winding disposed on said input leg portion, adapted for connection to a source of AC potential, an output winding disposed on said output leg portion, adapted for connection to a load circuit, said common leg portion being free of windings, and a capacitor connected across said output winding to provide a tank circuit, said common leg portion being constructed to saturate during a portion of each half cycle of the AC source potential, when said input winding is connected thereto, due to flux produced in said common leg portion by current flowing in said input winding and in said tank circuit, said output leg portion being constructed to be substantially nonsaturating.

19. A regulating transformer, comprising: a magnetic core including only first, second, and third magnetic paths, said first and second magnetic paths having a single leg portion common to both, said first and second magnetic paths being substantially nonsaturating except for their common leg portion, said third magnetic path including the nonsaturating portions of said first and second magnetic paths, means including an input winding providing an AC flux in the first magnetic path, means including an output winding and a capacitor providing an AC flux in the second magnetic path which adds to the flux of the first magnetic path in said common leg portion, driving said common leg portion into saturation during each half cycle of the AC flux in the first magnetic path, to efficiently couple the input and output windings through the third magnetic path only during this time, said output winding and capacitor being connected in parallel to provide a tank circuit which oscillates at the frequency of the AC flux in the first magnetic circuit to provide a stable voltage across said output winding, with the energy for sustaining the oscillation of the tank circuit being transferred from the input winding when the common leg portion saturates, and means including output terminals connected to provide an output voltage responsive to the stable voltage across said output winding.

20. The regulating transformer of claim 19 wherein the second magnetic path has a gap therein in the nonsaturating portion thereof.

21. The regulating transformer of claim 20 wherein the common leg portion has a gap therein having a dimension selected to retain the saturating characteristics of the common leg portion.